Patented Aug. 16, 1949

2,479,504

UNITED STATES PATENT OFFICE 2,479,504

INVESTMENT MATERIAL

Thomas E. Moore and Claude H. Watts, Toledo, Ohio, assignors to The Ransom & Randolph Company, Toledo, Ohio, a corporation of Ohio No Drawing. Application July 12, 1943, Serial No. 494,404

5 Claims. (Cl. 22—188)

This invention relates to an improved bonded refractory investment to be used in the manufacture of smooth precision castings of intricate shape by the lost wax method. This invention is concerned with the production of dental, jewelry, and industrial castings made from high fusing alloys.

A suitable investment, applicable to industrial mass production methods, must meet a number of exacting requirements.

Briefly, the method of manufacture is, forming the refractory mold about a large number of wax patterns or the like, which are attached to a central sprue; allowing the investment to set; slowly heating the mold so as to completely burn out the wax; heating the investment mold to the desired temperature; casting; and finally, recovering the casting from the refractory investment.

The major requirements for such a refractory investment are as follows:

1. In this method, the mold is destroyed in recovering the castings, therefore the refractory investment material must be comparatively inexpensive, else the high cost of manufacture would make the method impractical.
2. The formation of the refractory mold about the wax pattern must be simply and easily accomplished. Therefore the refractory investment must be such that it can be mixed to a thin pouring consistency, so that it will flow smoothly around the pattern without the formation of bubbles or voids.
3. The bonded refractory investment must not decompose or give off corrosive gases on heating to elevated temperatures.
4. After casting, the investment should not be too hard so as to make recovery of the casting difficult.
5. The investment should break away clean from the casting. The investment should not stick or "burn-in" on the surface of the metal.
6. The resulting castings must be sound, and must have a smooth surface free from pits, gas holes, nodules or roughness of any kind.
7. The investment must have sufficient strength at room temperature to permit ease in handling the mold.
8. The investment must have sufficient strength at the casting temperature to withstand the impact of the molten metal as it is forced into the mold. The investment must not crack or break down on casting.
9. It is preferable to provide materials which can be mixed, stored and shipped as a dry powder, and require only mixing with water to form the setting investment material.

The investment described herein has been developed to fulfil these requirements, which are not all satisfactorily met by any prior refractory investment material of which applicants are aware. It is, therefore, the object of this invention to produce an investment material having all of the enumerated qualities.

We have discovered that soluble acid forming phosphate salts, when mixed with a silica refractory and water, will react at elevated temperatures to form a very satisfactory bond having excellent refractory properties. Moreover, by varying the ingredients, proportions and treatment, it is possible to vary the compression strength of the fired mold to the desired strength.

The following chart shows the results of a number of compression strength tests run on several different acid phosphate salts mixed in the proportion of 5% and 10% salt to 95% and 90% silica, the W/I column signifying the proportion by weight of water to dry investment material in the wet mix.

Table I

| Phosphate Salt | Per Cent Salt | Per Cent Silica | W/I | Comp. Str. Tests Lbs. per Sq. In. | |
|---|---|---|---|---|---|
| | | | | 24 Hrs. at 180° F. | Fired to 1400° F. |
| $(NH_4)H_2PO_4$ | 5 | 95 | 22/100 | 251 | 479 |
| Do | 10 | 90 | 22/100 | 292 | 871 |
| $Mg(H_2PO_4)_2$ | 5 | 95 | 22/100 | 696 | 1,192 |
| Do | 10 | 90 | 22/100 | 1,810 | 1,879 |
| $Ca(H_2PO_4)_2$ | 5 | 95 | 22/100 | 118 | 474 |
| Do | 10 | 90 | 22/100 | 592 | 1,990 |
| $Na(H_2PO_4)$ | 5 | 95 | 22/100 | 1,050 | 1,660 |
| Do | 10 | 90 | 22/100 | 1,690 | 4,790 |

The exact reaction that takes place here is not fully understood. However, in the case of mono ammonium phosphate, there is probably a superficial reaction between the $P_2O_5$ and the $SiO_2$ to form a bonding silico-phosphate. In other cases complex metal silico-phosphates undoubtedly assist in forming the high temperature bond in addition to some silico phosphate that is formed.

The chart indicates an increase in fired strength as the percent of phosphate is increased and also shows that the fired strength varies for different salts when the same percent of each is used.

The highest compression strengths were obtained with acid sodium phosphate. Trisodium phosphate is not a satisfactory substitute for the monosodium phosphate.

The formulas shown in the chart set only on heating. In most cases, it is desirable to have an investment that can be mixed and that, after a convenient working time, will set at room temperature. This may be accomplished in a number of ways.

Organic binders, such as 3 to 5% gelatine, may be used to develop green strength, and also various gums such as gum arabic may be used if desired.

Oxychloride binders, such as magnesium oxychloride, zinc oxychloride, and zirconium oxychloride, may also be used as binders, as those familiar with the art will readily understand.

Although such binders may be used in connection with the present invention, they have some undesirable properties. The organic bonds require some time to develop green strength, and the oxychlorides are undesirable because a special liquid must be used. This is caused by the fact that the chloride salts necessary to the reaction are so deliquescent that they cannot be mixed directly into the dry powdered investment.

We avoid these difficulties by using a binder formed by adding to the investment powder a small percentage of metal oxide or hydroxide capable of reacting with a portion of the available phosphoric acid ions to precipitate an insoluble, interlocking, crystalline network which forms the bond. Examples of oxides having this property are oxides of calcium, strontium, magnesium, zinc, cadmium and copper and hydroxides of lithium and barium.

As will be shown later, it is important to control carefully the ratio of basic metal oxide to soluble acid phosphate salt in the investment. If too much reactive oxide is employed in proportion to the acid phosphate, the supply of available acid is so depleted in forming the temporary bond that there is insufficient silico-phosphate bond formed upon firing. However, by the proper control of these two bond forming materials it is possible to produce any desired combination of strengths both in the green and fired condition.

In making fine castings the refractory properties of an investment are determined by the least refractory material that it contains and in most cases the bond forming compounds are those which reduce the refractoriness of the material. Sodium compounds have been used extensively to bond refractory materials. However, such compounds fuse at such a low temperature as to be unsuitable for use except in very small proportions in casting work of this type. For example, in casting metals of the high fusing ferrous alloys containing nickel and chromium which melt between 3000° F. and 3200° F. it is preferable to use no sodium compounds or not more than 1 to 2%. For some types of casting work such, for example, as the lower fusing metals and alloys including the malleable irons melting between 2400° F. and 2600° F. and other alloys with a melting range of from 2000° F. to 2600° F., generally speaking a less refractory investment may be used satisfactorily.

The following examples will serve to illustrate investments in accordance with the invention. In these formulas the silica consists of a graded composition composed of 30% 50 mesh silica, 30% 100 mesh silica, balance 200 mesh silica to make up 100% for the formulas. To illustrate, in Table No. II, Formula No. 1 consists of

|   | Per cent |
|---|---|
| MgO | 3 |
| $(NH_4)H_2PO_4$ | 5 |
| 50 mesh silica | 30 |
| 100 mesh silica | 30 |
| 200 mesh silica | 32 |

The water-investment ratio is given in m.l. per 100 grams of refractory investment and this ratio may vary from one formula to another so as to maintain the same consistency mix.

Table II

| Formula No. | Per Cent MgO | Per Cent $(NH_4)H_2PO_4$ | Per Cent Silica | W/I m.l./g. | Comp. Str. Lbs. per Sq. In. | |
|---|---|---|---|---|---|---|
| | | | | | 24 Hrs. at 180° F. | Heated to 1400° F. |
| 1 | 3 | 5 | 92 | 22/100 | 89.6 | 83.8 |
| 2 | 3 | 6 | 91 | 22/100 | 86.7 | 128.0 |
| 3 | 3 | 7 | 90 | 22/100 | 227.0 | 129.5 |

The compression strength of this series is lower than is usually desired, and the surfaces of the castings were somewhat rough. Higher percentages of acid ammonium phosphate tended to make the castings rougher. The compression strength can be increased considerably by small additions of trisodium phosphate, as shown in Table III, and much smoother castings are produced.

Table III

| Formula No. | Per Cent MgO | Per Cent $(NH_4)H_2PO_4$ | Per Cent $Na_3PO_4$ | Per Cent Silica | W/I m.l./g. | Comp. Str. Lbs. per Sq. In. | |
|---|---|---|---|---|---|---|---|
| | | | | | | 24 Hrs. at 180° F. | Heated to 1400° F. |
| 4 | 3 | 5 | 1.5 | 90.5 | 24/100 | 160.0 | 88.2 |
| 5 | 3 | 6 | 1.0 | 90.0 | 22/100 | 328.0 | 111.0 |
| 6 | 3 | 6 | 2.0 | 89.0 | 22/100 | 384.0 | 138.0 |
| 7 | 3 | 7 | 1.0 | 89.0 | 20/100 | 550.0 | 254.0 |
| 8 | 3 | 8 | 1.0 | 88.0 | 20/100 | 600.0 | 298.0 |
| 9 | 8 | 8 | 1.0 | 83.0 | 24/100 | 190.0 | 77.8 |

It will be noted that the MgO is relatively too high in Formula 9, so that both the initial and fired strength are less than with Formula 8, otherwise the same. Comparing Formula 4 with Formula 1 of Table II, and Formulas 5 and 6 with Formula 2, it will be seen that there is not much change in the fired strength resulting from the addition of trisodium phosphate; but comparing Formula 7 with Formula 3, it is seen that the fired strength is about doubled. With Formula 6, there was some cracking, but none with Formula 7. Although not shown by the table, it has been found that with increased amounts of the acid phosphate, increased amounts of the normal sodium phosphate may be employed without cracking.

In Table IV, the effect of varying proportions is shown where acid magnesium phosphate is employed in place of ammonium phosphate.

Table IV

| Formula No. | Per Cent MgO | Per Cent Mg(H₂PO₄)₂ | Per Cent Silica | W/I m. l./g. | Comp. Str. Lbs. per Sq. In. 24 Hrs. at 180° F. | Comp. Str. Lbs. per Sq. In. Heated to 1400° F. |
|---|---|---|---|---|---|---|
| 10 | 3 | 5 | 92 | 22/100 | 79.6 | 48.9 |
| 11 | 3 | 6 | 91 | 22/100 | 96.3 | 37.8 |
| 12 | 3 | 9 | 88 | 20/100 | 296.0 | 74.0 |
| 13 | 3 | 12 | 85 | 22/100 | 497.0 | 92.4 |
| 14 | 3 | 15 | 82 | 22/100 | 1,000.0 | 506.0 |
| 15 | 3 | 20 | 77 | 21/100 | 3,200.0 | 1,200.0 |
| 16 | 8 | 8 | 84 | 24/100 | 94.0 | 41.8 |

Table V shows the compression strength for varying compositions of MgO, mono ammonium phosphate, mono magnesium phosphate, and silica.

Table V

| Formula No. | Per Cent MgO | Per Cent (NH₄)H₂PO₄ | Per Cent Mg(H₂PO₄)₂ | Per Cent Silica | W/I m. l./g. | Comp. Str. Lbs. per Sq. In. 24 Hrs. at 180° F. | Comp. Str. Lbs. per Sq. In. Heated to 1400° F. |
|---|---|---|---|---|---|---|---|
| 17 | 3 | 5 | 2 | 90 | 22/100 | 304.0 | 276.0 |
| 18 | 3 | 6 | 2 | 89 | 22/100 | 457.0 | 505.0 |
| 19 | 3 | 6 | 1 | 90 | 22/100 | 452.0 | 328.0 |
| 20 | 5 | 10 | 3.5 | 81.5 | 20/100 | 1,070.0 | 546.0 |

This series has a very good compression strength and is particularly suitable where a highly refractory composition is indicated.

Formulas 21, 22, 23 and 24 in Table VI illustrate the effect on compression strength of adding bauxite, clay, and iron oxide to the formulas. In every case, such additions lower the fired strength. The clay in this instance is a non-plastic kaolinite. Formulas Nos. 22, 23 and 24 should be compared with No. 18, while No. 21 should be compared with No. 17 (Table V).

Table VI

| Formula No. | Percent (NH₄)H₂PO₄ | Percent Silica | | Comp. Str. Lbs. per Sq. In. 24 Hrs. at 180° F. | Comp. Str. Lbs. per Sq. In. Heated to 1400° F. |
|---|---|---|---|---|---|
| 21 | 5 | 82 | 8% Bauxite | 344.0 | 202.0 |
| 22 | 6 | 81 | 8% Clay | 372.0 | 347.0 |
| 23 | 6 | 88.5 | 0.5% Fe₂O₃ | 482.0 | 396.0 |
| 24 | 6 | 87.0 | 2.0% Fe₂O₃ | 375.0 | 313.0 |

In each of Formulas 21 to 24 there is 3% of MgO, 2% of Mg(H₂PO₄)₂, and the mixture was made with 22 cc. water to 100 grams of powder.

As will be seen from the foregoing tables, the fired strength is capable of wide variation, and is adjustable for varying needs. The most satisfactory compression strength for an investment formula will vary depending upon the type of casting that is being made. The size, shape and design of the piece to be cast are all determining factors. In general, a fired compression strength of 250 pounds per square inch will be satisfactory for small work, while larger pieces and castings where the mold material is required to withstand greater pressures may require a fired strength of from five hundred to one thousand pounds per square inch. It will be seen that Formulas 7, 8, 14, 17 to 20, and 22 to 24 come within this desirable range, Formula 15 is stronger than usually desirable, while the others are weaker.

The magnesium oxide used in these formulas was finely divided fused MgO. Ordinary powdered MgO cannot be used satisfactorily because it reacts too fast. As previously stated, other metal oxides and/or hydroxides may also be used in the practice of this invention either alone or in combination with one another. Oxides such as CdO, CuO and ordinary crystallized ZnO are sufficienty slow to react that it is not necessary to use them in the fused form. Where other compounds are used in place of MgO they are used in approximately equivalent molecular proportions.

The silica may be employed in any of its various forms, such as quartz, tridymite, cristobalite, and also the hydrated forms of silica—silicic acid, tripoli, diatomaceous earth, etc. Silica is the most desirable refractory material because it is inexpensive and because it forms a very satisfactory high temperature bond with the phosphate. However, other oxides of the silicon group may be used in place of silicon dioxide, such as the oxides of titanium, zirconium, and thorium, and other refractory materials, such as non-plastic refractory clays, fire clay, kaolinite, sillimanite, andalusite, mullite, silicon carbide, ziconium silicate, titanium silicate, the spinels, refractory aluminum oxide, etc., may be used to replace at least a part of the silica, if desired, the essential feature being that the refractory material shall contain a component reactive with the residuary acidity of the phosphate material, when fired, to produce a strengthening bond.

The addition of some zirconium silicate to the silica results in a more ready separation of the mold from the casting, but more than 25% zirconium silicate may result in a somewhat roughened surface on the casting.

Compounds producing P₂O₅ at elevated temperatures may comprise acid salts of ortho, meta, and pyrophosphoric acid with lithium, magnesium, calcium, ammonium, strontium, barium, copper, zinc, cadmium, et cetera. Also, besides ammonium phosphate, there may be used the organic amino compounds such as primary, secondary, and tertiary methyl, ethyl and n-propyl amine phosphates. However, any large quantity of ammonia or other gas driven off during heating is undesirable.

Compounds other than the metal oxides and hydroxides named above may be used to produce a set at room temperature through the reaction with phosphate ions. Portland cement may be used with some success, as well as compounds such as magnesium zirconate, calcium aluminate, etc.

The ratio of metal oxide to acid phosphate salt required to produce the desired fired strength is dependent upon so many variables that this ratio must be determined by trial and error. The chemical equation of the reaction involved may be used to give some indication of the proper proportions; however, the reactions represented probably do not go to completion. Where the reaction of the oxide is too rapid, fused oxide may be used. Also, the state of subdivision of the oxide affects the activity—the more finely divided oxide being more active than coarser particles. However, a sufficient amount of a particular metal oxide or compound may be used to accomplish the desired initial set, and the percentage of acid phosphate salt in the formula may be increased until the desired fired strength is attained.

It will be noted from the foregoing that the essential components of the new investment material are an acid phosphate compound, a material for causing initial set which is capable of reacting with some of the acid phosphate material at normal temperatures to form an insoluble phosphate, and that thereafter the phosphate material shall react upon heating with a component of the refractory material to form a bond for the fired material.

The initial setting ingredient is usually a metal oxide or hydroxide, selected for a degree of reactivity giving the desired time for setting, and in quantity sufficient to give the required initial strength. 3% of this material has been given in most of the examples, and less than 5% is usually sufficient and preferable. The acid phosphate material may be a single phosphate or a combination of phosphates, and must be sufficient in amount to form the initial set and have, or release, sufficient acidity for the desired refractory set upon firing. This final acidity may be partly the result of decomposition, but the gas, driven off by such decomposition, must not be excessive. 5% to 20% of the acid phosphate material is given in the examples, and the usually desirable range is found within this proportion. The refractory material is preferably silica or of the silica group, although other refractory material may be included.

Therefore, while specific formulas have been given, certain of which are claimed as the embodiment of the invention now preferred, it will be understood that the chief purpose of the formulas given is to show how varying the proportions affects the properties of the resulting investment material, thus enabling those skilled in the art to modify the proportions so as to utilize the invention to suit their particular needs.

What we claim is:

1. A powdered material capable of being mixed with water to form refractory investment material, the major part of which is refractory material of the group consisting of silica, zirconium dioxide, zirconium silicate, titanium dioxide, titanium silicate, kaolinite, sillimanite, andalusite and mullite, and comprising a minor but substantial part of basic material selected from the group consisting of the oxides of magnesium, calcium, strontium, zinc and cadmium and the hydroxide of barium the basic materials being in proportions molecularly equivalent to 3% to 5% by weight of magnesia, and from about 5–20% by weight of acid phosphate salts having residual acidity when heated after reacting with the basic material, the balance of the composition being refractory material as set forth above, the composition yielding an investment having a fired compression strength of at least 250 pounds per square inch.

2. A material in accordance with claim 1 in which the refractory material constitutes from 81½ to 89% of the investment material and the basic material consists of from 3% to 5% of magnesia.

3. A material in accordance with claim 1 in which the basic material is zinc oxide.

4. A powdered material capable of being mixed with water to form a refractory investment material and comprising 81.5% to 89% silica, about 3% fused magnesia and the remainder phosphate salts having residual acidity when heated after reacting with the magnesia.

5. A powdered material consisting of about 89% silica, 3% fused magnesia, 6% ammonium dihydrogen phosphate and 2% magnesium dihydrogen phosphate the composition yielding an investment having a fired compression strength of about 505 pounds per square inch.

THOMAS E. MOORE.
CLAUDE H. WATTS.

REFERENCES CITED

The following references are of record in the file of this patent:

UNITED STATES PATENTS

| Number | Name | Date |
|---|---|---|
| 1,751,482 | Leasman | Mar. 25, 1930 |
| 2,072,212 | Moosdorf | Mar. 2, 1937 |
| 2,102,444 | Allen | Dec. 14, 1937 |
| 2,121,969 | Laird | June 28, 1938 |
| 2,152,152 | Prosen | Mar. 28, 1939 |
| 2,209,035 | Prosen | July 23, 1940 |
| 2,243,094 | Grossman | May 27, 1941 |